(12) United States Patent
Schrimmer

(10) Patent No.: US 8,708,513 B2
(45) Date of Patent: Apr. 29, 2014

(54) DEVICE AND SYSTEM FOR ILLUMINATED APPAREL

(75) Inventor: Michael L. Schrimmer, Vernon Hills, IL (US)

(73) Assignee: I Pee Holding, LLC, Vernon Hills, IL (US)

( * ) Notice: Subject to any disclaimer, the term of this patent is extended or adjusted under 35 U.S.C. 154(b) by 715 days.

(21) Appl. No.: 12/855,356

(22) Filed: Aug. 12, 2010

(65) Prior Publication Data
US 2012/0039069 A1 Feb. 16, 2012

(51) Int. Cl.
*F21V 21/08* (2006.01)
*A41D 1/04* (2006.01)
(52) U.S. Cl.
USPC ............. 362/102; 362/103; 362/84; 2/102
(58) Field of Classification Search
USPC ......... 362/103, 800, 106, 108, 154, 156, 124, 362/34, 189, 199, 806, 69, 244, 206, 102, 362/84, 276; 2/69, 244, 206, 102
See application file for complete search history.

(56) References Cited

U.S. PATENT DOCUMENTS

| 6,082,867 A * | 7/2000 | Chien ............................. 362/84 |
| 6,523,968 B1 * | 2/2003 | Walker ........................... 362/103 |
| 2002/0114155 A1 * | 8/2002 | Katogi et al. ................. 362/219 |
| 2003/0026089 A1 * | 2/2003 | Hsu ................................ 362/103 |
| 2009/0052167 A1 * | 2/2009 | Ono ............................... 362/103 |
| 2009/0201671 A1 * | 8/2009 | Huntley ........................ 362/108 |

* cited by examiner

*Primary Examiner* — Joseph L Williams

(57) ABSTRACT

A system for creating a lighted apparel design includes a light element and a securing member. The securing member has a base and a capture portion. The capture portion is located, at least in part, attached to the base and defines a capture region configured to releasably secure the light element therein. The securing member is secured to an associated apparel item and the light element secured in the capture region to create a lighted design on the apparel item. A lighted apparel item is also disclosed.

16 Claims, 4 Drawing Sheets

US 8,708,513 B2

DEVICE AND SYSTEM FOR ILLUMINATED APPAREL

BACKGROUND OF THE INVENTION

The present invention relates to illuminated apparel. More particularly, the present invention relates to a device and system for creating self-designed illuminated apparel.

Costuming and the like is a wide-spread activity. Whether it is for Halloween, parties, celebrations, sporting events, dance recitals, theatrical events or the like, costumes have become a part of everyday life.

Often, the most attractive and "best" costumes are those that are created by individuals. Such self-made costumes are often the most creative, most bold and aesthetically pleasing costumes at a gathering.

One way in which to make a costume or an individual stand out is to use illumination to show off the costume or parts of the costume or an individual in a darkened area. This can be done in a number of way. Blinking LED buttons or the like can be attached to the costume. While these LEDs have wonderful effects, they are small and limited in their light output and the effects that they provide.

Elongated light elements, such as chemiluminescent light sticks or lights of all types attached in an elongated manner such as strings of lights, strands, or electro-luminescent wire can also provide stimulating effects. However, to date, the only way in which to affix the light elements is to sew the elements directly to the costume. Although the effects are outstanding, the only way in which to change or modify the costume is to cut the stitching and re-sew or re-stitch the light element to the costume. This is both time consuming and can be destructive to the costume. Moreover, on certain apparel items such as hats, caps, belts or the like, it may be difficult or just not feasible to attach the elements by sewing or stitching.

Accordingly, there is a need for a device that permits mounting light elements to apparel items. Desirably, such a device is readily applied to the apparel item without sewing, stitching or the like. More desirably still, such a device is removable and re-applicable to redesign or remake the lighting effects on the apparel item. Still more desirably, such a device permits quickly and efficiently accomplishing such removal and application or reapplication of the light elements.

SUMMARY OF THE INVENTION

A system for creating a lighted apparel design includes a light element and a securing member. The securing member has a base and a capture portion. The capture portion is located, at least in part, attached to the base and is preferably configured to releasably secure the light element therein. The securing member is secured to the apparel item to create a lighted design, symbol or the like on the apparel item.

The capture portion is on a front surface of the base and the securing member includes a releasable securing element on a rear surface thereof. Alternately, the capture portion is on a side surface of the securing member. The releasable securing element can be an adhesive, a pin, such as a pin having a closure to enclose an end of the pin, or a magnet and a magnetic element for magnetically attracting the magnet, a snap, a hook and loop-type mechanical fastening system, or the like.

A lighted apparel item is also disclosed.

These and other features and advantages of the present invention will be apparent from the following detailed description, in conjunction with the appended claims.

BRIEF DESCRIPTION OF DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
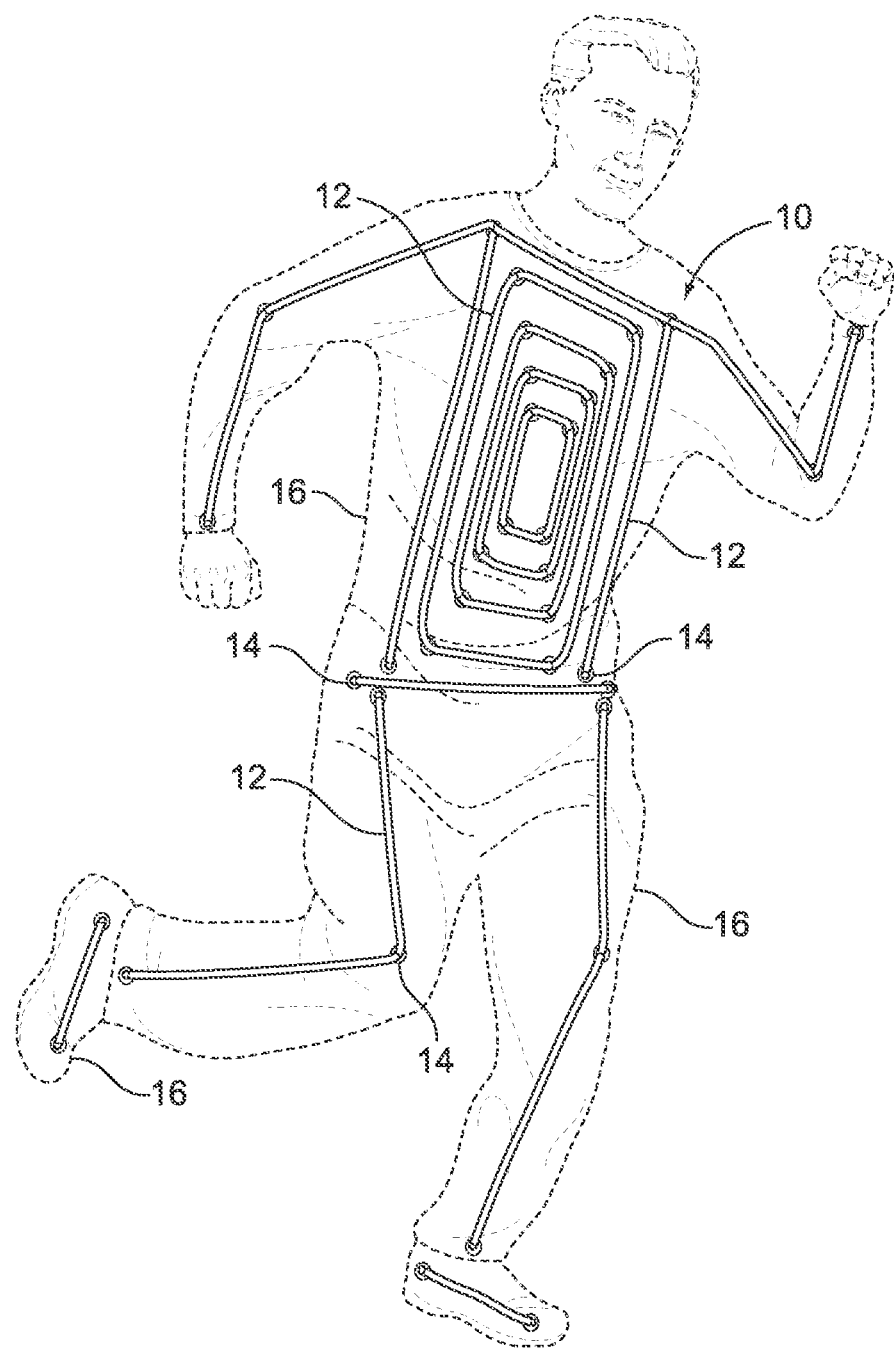
FIG. 1 illustrates a costume, on a user, having multiple light elements mounted thereto.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular, FIG. 1, there is shown a device and system 10 for illuminated apparel. The system 10 includes one or more light elements 12 and one or more securing devices or members 14 for securing the light elements 12 to an apparel item 16. The light elements 14 can include, for example, chemiluminescent light sticks or ropes, elongated light emitting diode (LED) strings or elements, strings of lights, strands, electro-luminescent wire and the like. Those skilled in the art will appreciate the wide variety of light elements 12 that can be used to decorate or embellish the apparel item 16.

Figure 2A:
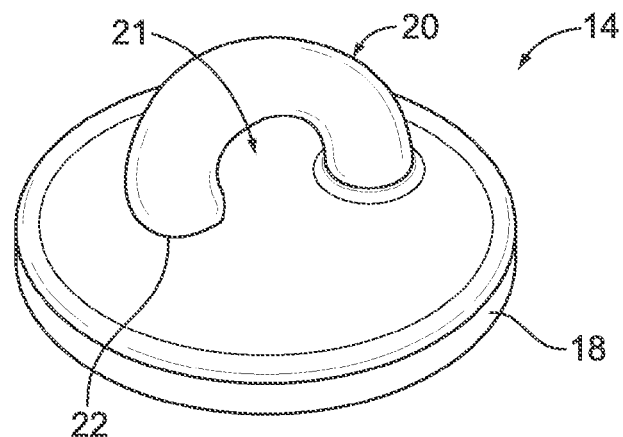
FIG. 2 is a perspective view of one securing device for securing the light elements to an apparel item.
Figure 2B:
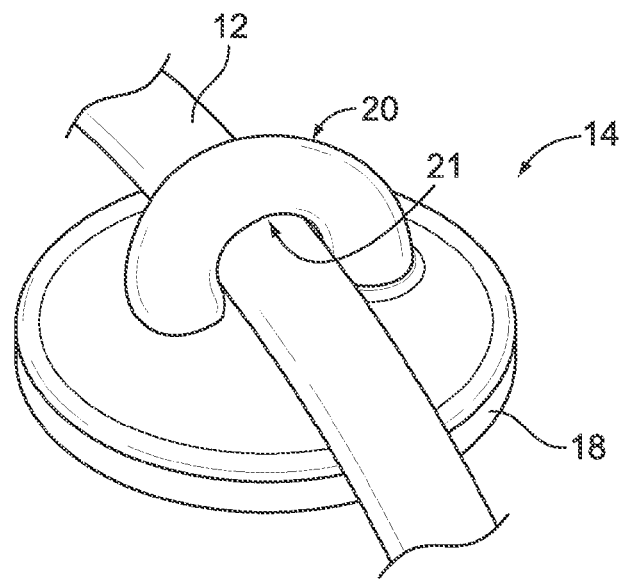

The securing members 14 are configured to be removable and re-applicable to the apparel item 16. The securing members 14 each include a base portion 18 and a capture portion 20, by which the light element 12 is captured or secured. The securing element 14 illustrated in FIG. 2 has a U-shaped capture portion 20 that is open to or separated from the base 18 at one end 22 (a free end), and is formed connected to or with, e.g., integral, the base 18 at an opposite end 24. The capture portion 20 defines a capture region 21. The illustrated securing member 14 is formed as a molded product from, for example, a plastic material, and as such the capture portion 20 is formed unitary with the base 18. It will, however, be appreciated that the capture portion can be formed separate from the base and subsequently affixed or joined thereto, in a permanent or a temporary manner, for example, to permit applying or reapplying only the capture portion to a base. The light element 12 is described as releasably secured in the capture region 21. By releasably secured, it is to be understood that the light element 12 can be readily inserted or fitted into the securing region 21 and removed from the securing region 21. Accordingly, it will be understood that the securing members 14 can be applied to and removed from the apparel item 16 and the light elements 12 can be inserted into and removed from the securing region 21.

It will also be appreciated that the capture portion 20 can be fully connected, e.g., at both ends, to the base 18. A contemplated securing member 14 is made from a material that provides some resistance to pulling or loosening of the light element 12 once it is secured therein. That is, the securing element 14 is formed such that the light element 12 can be readily pulled or positioned between the capture portion 20 and the base 18 (as by urging the light element 12 under the free end 22 into the capture region 21), but will not inadvertently loosen or fall out of the securing member 14. Those skilled in the art will appreciate that the illustrated capture portion 20 can be shaped in any manner, such as the illustrated rounded shape, a hook shape, a twisted, e.g., figure-8 shape or the like, such shapes being functionally adapted to secure a light element 12 therein.

Figure 3:
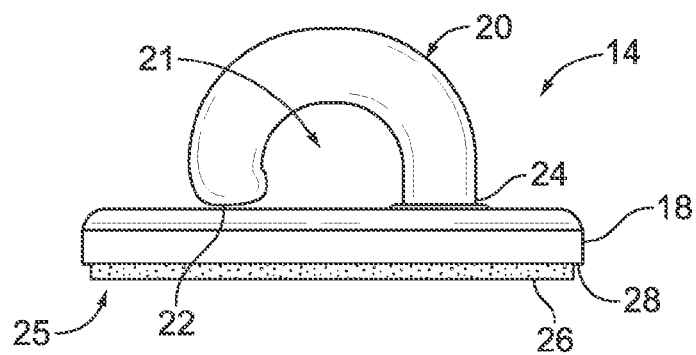
FIG. 3 is a front view of an embodiment of a securing device that includes an adhesive securing element.
Figure 4:
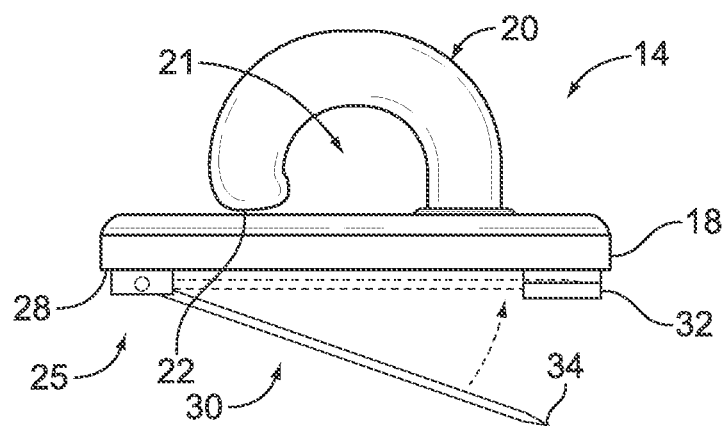
FIG. 4 is a front view of an alternate embodiment of a securing device that includes a pin securing element.
Figure 5:
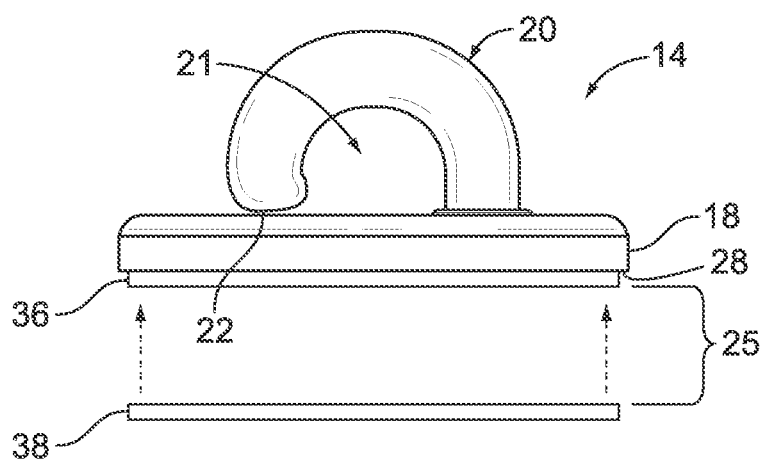
FIG. 5 is a front view of still another embodiment of a securing device that includes a magnetic securing element.
Figure 6:
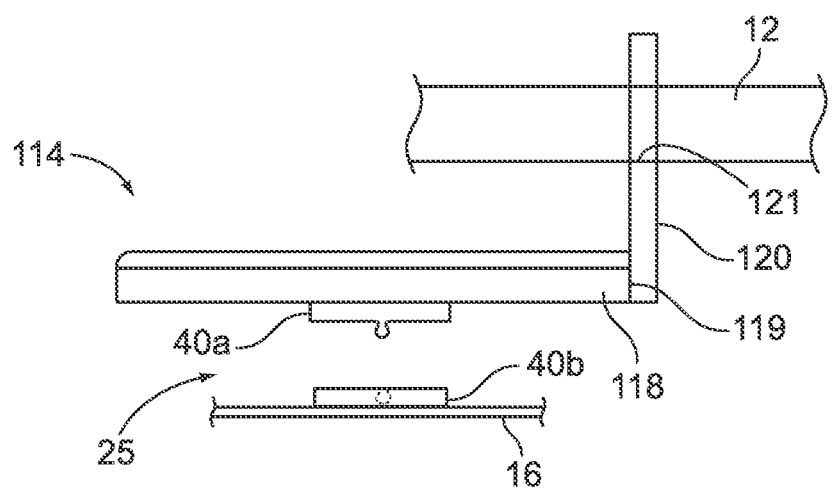
FIG. 6 is a side view of still another embodiment of a securing device that includes a capture portion mounted to the side of the base and further includes a mechanical snap securing element.
Figure 7:
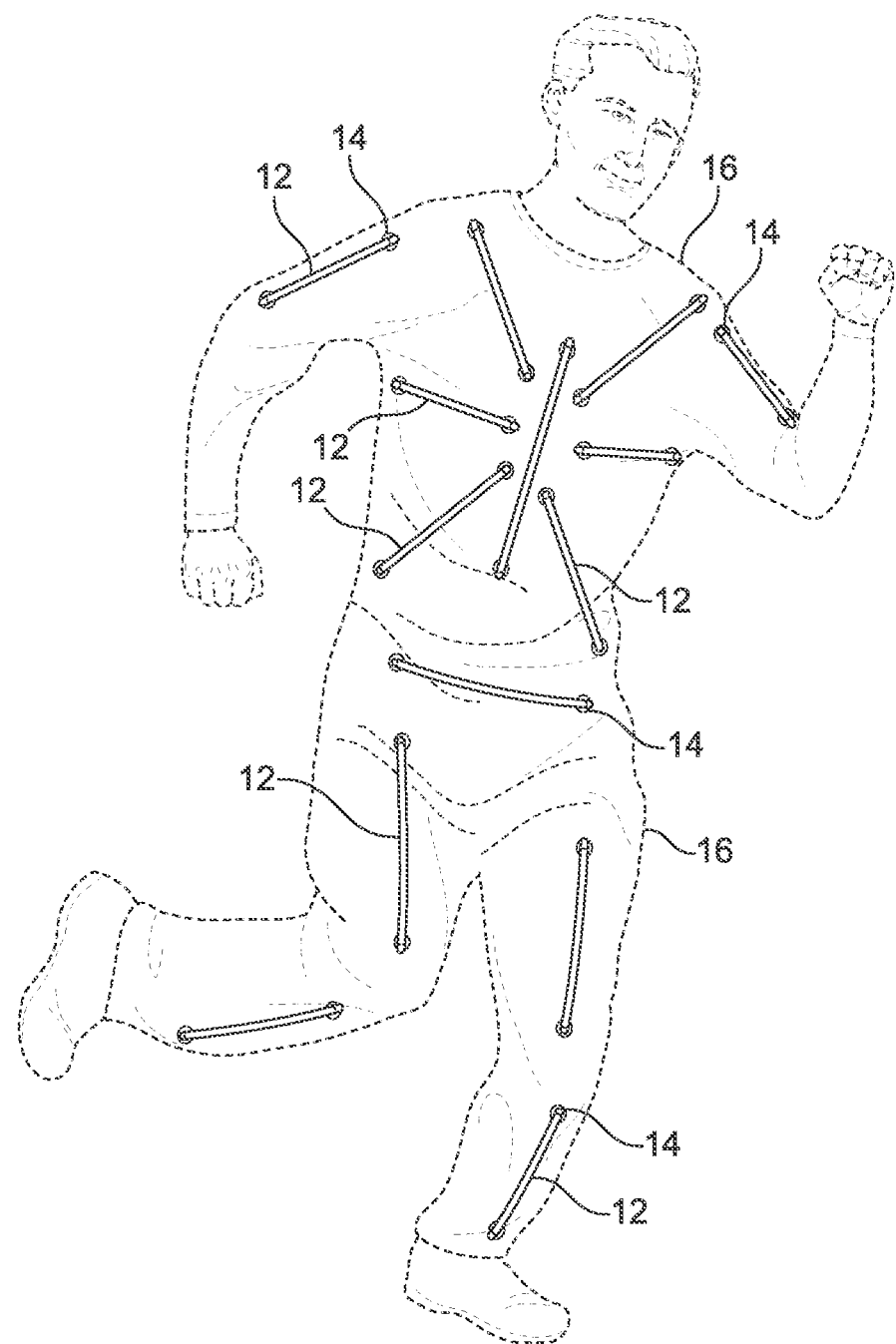
FIG. 7 is another illustration, on a user, having multiple, shorter light elements mounted to the user's apparel.

As seen in FIG. 3, the securing member 14 can be configured with a securing element 25, such as an adhesive or like element 26, on a rear surface 28 thereof, to secure the member 14 to the apparel item 16. Preferably, such an adhesive 26 can be applied to the apparel item 16, removed from the item 16 and reapplied, without the reapplication of adhesive. Alternately, as shown in FIG. 4, the securing member 14 securing element 25 can include a pin 30 or like mechanical element on the rear surface 28 which can be affixed to the apparel item 16. A hinge-type pin 30 or the like, with a closure 32 to enclose the pin end 34 is contemplated. Alternately still, as illustrated in FIG. 5, the securing element 14 can include a magnet or a magnetic backing 36 and a suitable magnet 38 or backing can be provided to secure the member 14 to the apparel item 16. Alternately still, as seen in FIG. 6, a mechanical snap element 40 with one portion 40a affixed to the securing member 114 and the other portion 40b affixed to the apparel item 16 can be used. Other contemplated securing elements 25 include hook and loop-type mechanical fasteners, such as VELCRO® brand fasteners and the like. Such securing elements 25 can be located anywhere on the member 14, 114 to permit the member 14, 114 to be secured to the apparel item 16.

It will also be understood that the capture portion 120 can be positioned on a side 119 of the securing member base 118, such as that illustrated in FIG. 6. In the illustrated alternate securing member 114, the capture portion 120 can be configured as a tab-like element mounted to the side 119 of the base 118, extending upward. The capture region 121 can be configured as a hole or opening in the tab 120 for securing a light element 12 therein. Such alternate configurations are within the scope and spirit of the present invention.

It will be appreciated that the above-described configurations provide a securing member 14, 114 that can be applied to an apparel item 16 to allow the user to use their creativity in creating a wide variety of different designs and aesthetics as desired. Advantageously, the securing members 14, 114 can be applied and reapplied to and reused with the same or a different item as desired.

The light elements 12 can be, as shown in FIG. 1, elongated light elements, such as chemiluminescent sticks or ropes, or can be shorter sticks-like elements, as desired. It will be appreciated that although chemiluminescent elements, LED and other strings of lights, electro-luminescent wires and the like are shown or described, any number of different items having flexible or rigid characteristics, as desired, can be used with the present securing members 14.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A system for creating a lighted apparel design, comprising:
    a light element; and
    a securing member, the securing member having a base and a capture portion, the capture portion located on a front surface of the base, at least in part, attached to the base to define a capture region configured to releasably secure the light element therein, the capture portion being a U-shaped element extending from a front surface of the base and returning toward the base to define the capture region, wherein at least one end of the U-shaped portion is connected to the base, and
    wherein the securing member is removably secured or attached to an associated apparel item, and the light element is removably secured in the capture region, to create a lighted design on the apparel item.

2. The system in accordance with claim 1 wherein the securing member includes a releasable securing element on a rear surface thereof.

3. The system in accordance with claim 2 wherein the releasable securing element is an adhesive.

4. The system in accordance with claim 2 wherein the releasable securing element is a pin.

5. The system in accordance with claim 4 wherein the pin has a closure to enclose an end of the pin.

6. The system in accordance with claim 2 wherein the releasable securing element is a magnet and wherein the system includes a magnetic element for magnetically attracting the magnet.

7. The system in accordance with claim 6 wherein the magnet is mounted to the rear surface of the securing member.

8. The system in accordance with claim 1 wherein the connected end of the U-shaped portion is formed integral with the base.

9. The system in accordance with claim 1 wherein an opposite end of the U-shaped portion is free from, but extends to about the base.

10. A securing member for attachment to an associated apparel item, for removably securing an associated a light element to the apparel item, comprising a base and a capture portion, the capture portion located, at least in part, attached to the base to define a capture region configured to releasably secure the light element therein, wherein the securing member is secured or attached to the associated apparel item, and the light element is removably secured in the capture region, to create a lighted design on the apparel item, and wherein the capture portion is on a front surface of the base and wherein the securing member includes a releasable securing element thereon.

11. The securing member in accordance with claim 10 wherein the releasable securing element is an adhesive.

12. The securing member in accordance with claim 10 wherein the releasable securing element is a pin.

13. The securing member in accordance with claim 12 wherein the pin has a closure to enclose an end of the pin.

14. The securing member in accordance with claim 10 wherein the releasable securing element is a magnet and wherein the securing member includes a magnetic element for magnetically attracting the magnet.

15. The securing member in accordance with claim 14 wherein the magnet is mounted to the rear surface thereof.

16. A lighted apparel item, comprising:

an apparel item;

a light element; and multiple removable securing members, each removable securing member having a base and a capture portion, the securing members being spaced apart from one another, each members' capture portion located, at least in part, attached to its respective base to define a capture region configured to releasably secure the light element therein, wherein the securing members are removably secured to the apparel item, and the light element is removably secured in the capture regions, to create a lighted design on the apparel item.

* * * * *